UNITED STATES PATENT OFFICE.

ALCIDE FRANCOIS POIRRIER, OF PARIS, FRANCE.

PROCESS OF MAKING SULFUR DYES.

SPECIFICATION forming part of Letters Patent No. 646,873, dated April 3, 1900.

Application filed September 26, 1899. Serial No. 731,708. (No specimens.)

*To all whom it may concern:*

Be it known that I, ALCIDE FRANCOIS POIRRIER, a citizen of the Republic of France, residing in Paris, France, have invented a new and useful Improvement in the Manufacture of New Substantive Black Coloring-Matters, which is fully set forth in the following specification.

The processes hitherto employed for obtaining sulphureted substantive coloring-matters consist always in heating a more or less complex polyamido, amido-hydroxyl, amidosulfo, amido-hydroxyl-sulfo, &c., aromatic substance with sulfur or with sulfur and sodium sulfid. Nevertheless in one case (Patent No. 103,646 and French Patent No. 271,388) for sulfur there has been substituted sulfur chlorid acting directly upon a single substance which generates the coloring-matter the same as formerly Beruthsen had also employed sulfur chlorid instead of sulfur in the preparation of thiodiphenylamin. (*Thidien in der Methylenblangruppe, Annalen der Chemie*, 230, page 73 à 211.) I have since found that other sulfur combinations are capable of transforming complex aromatic polyamido or amido-hydroxyl bodies into sulfurated coloring-matters similar to the substantive coloring-matters hitherto obtained. My process consists in treating together in the first place commercial sulfur chlorid and simple aromatic substances, such as anilin or phenol, then to subject the combination thus obtained to reaction with more complex polyamido or amido-hydroxyl bodies.

Example I: One hundred parts of phenol have added to them drop by drop, with active agitation, two hundred parts of commercial sulfur chlorid. Volumes of hydrochloric acid are evolved. Then the material is heated, after the reaction appears to be at an end, to 150° to 160° centigrade for an hour, and then it is added to fifty parts of paraphenylenediamin. The components form a homogeneous mixture which is kept for two hours at 200° centigrade. The mass obtained is hard and friable. It is insoluble in water or acids. It is soluble in alkalies, and especially in sodium sulfid. The solution when precipitated by acid gives a greenish-blue mass which a trace of oxidant changes to blue black. The mass obtained is treated as follows: One hundred parts of the product are introduced in small doses into three hundred parts of sodium sulfid melted in its water of crystallization, slowly evaporated, and heated to 200° centigrade to complete the drying. The coloring-matter thus obtained dyes unmordanted cotton blue black. In this Example I commercial cresol can be substituted for the phenol.

Example II: One hundred parts of phenol are treated as in Example I; but the mass obtained after reaction of sulfur chlorid is treated with five parts of paramidophenol. The product obtained is more brilliant than the former. It is, like it, insoluble in water and acids, but very soluble in alkalies and alkaline carbonates, as well as in sodium sulfid. For use in dyeing the reaction product is melted in sodium sulfid and dried, as described above. It dyes cotton a more violet shade than the product of Example I.

For the phenol in Example II may be substituted commercial cresol or any phenolic substance and for the paramidophenol a more complex hydroxyl, such as paraoxy-diamido-diphenylamin.

Example III: In a cast-iron apparatus closed and provided with a reflux appliance and agitator is charged one hundred and fifty parts of anilin hydrochlorate. It is heated to 120° to 130° centigrade externally by an oil-bath. Then two hundred and forty parts of sulfur chlorid are very slowly added. There is a violent evolution of hydrochloric acid, and when this becomes more slow the temperature is gradually raised to 180° centigrade. It is ascertained that at this moment there is no longer any reflux in the cooling apparatus. Then one hundred and twenty parts of paraphenyldiamin are rapidly added and the temperature is raised to 200° centigrade for eight hours. The mass obtained is dry, spongy, and brilliantly black. For its use and application in dyeing this mass is introduced into one thousand parts of crystallized sodium sulfid dissolved in very little water. It is agitated for several hours, the temperature being kept at 120° centigrade until a homogeneous mass is obtained. Then the whole is dried at about 200° centigrade for several hours.

The coloring-matter that is not rendered soluble in sodium sulfid is insoluble in water, acids, and alkalies; but it is soluble in sodium sulfid, giving bluish or greenish solutions. The solutions are precipitated by acids, sea-salt, and concentrated alkalies.

Example IV: The operation is the same as in Example III; but fifty parts of paramidophenol are substituted for the fifty parts of paraphenylenediamin. The coloring-matter obtained possesses the general characteristics of that of Example III, but is more soluble. It is slightly soluble in alkalies, and the shades which it produces on unmordanted cotton are a little more bluish. In this example may be substituted for the paramidophenol another amidohydroxyl, such as paraoxy-diamidodiphenylamin.

Generally all these coloring-matters dye unmordanted cotton in a boiling bath with a little salt. The shades obtained become much deeper when they are exposed to the air or when they are oxidized by ordinary oxidants, bichromates, acids, &c.

All these coloring-matters are rendered insoluble by salts of the heavy metals. They give insoluble combinations with metallic oxids. In these conditions the shades thus fixed on cotton have considerable resistance to ordinary and even to concentrated lyes.

I do not limit my claim to the quantities of the reagents stated in the examples, these being given rather as types of the preparation, and I reserve the right to increase or diminish at will the proportions of the reagents and the temperatures. Furthermore, it will be understood that where phenol is mentioned in the following claims any other simple aromatic substance—such as anilin, cresol, or phenolic substances—may be employed with analogous results, and, similarly, where paraphenylene-diamin is mentioned any other complex aromatic substance—such as paramidophenol, paraoxydiamido-diphenylamin, or diamido-oxy-diphenylamin—may be employed with analogous results.

I claim—

1. The herein-described process of producing sulfureted coloring-matters consisting in treating a simple aromatic substance with sulfur chlorid, then heating to a suitable temperature, adding a complex aromatic substance, and increasing the temperature of the mass and maintaining the increased temperature for a suitable period.

2. The herein-described process of producing sulfureted coloring-matters consisting in treating a simple aromatic substance with sulfur chlorid then heating to a suitable temperature, adding a complex aromatic substance, then increasing the temperature of the mass and maintaining the increased temperature for a suitable period, and finally melting in sodium sulfid and drying.

3. The herein-described process of producing sulfureted coloring-matters consisting in treating phenol with sulfur chlorid, then heating to a suitable temperature, adding paraphenylenediamin, and increasing the temperature of the mass and maintaining the increased temperature for a suitable period.

4. The herein-described process of producing sulfureted coloring-matters consisting in treating phenol with sulfur chlorid, then heating to a suitable temperature, adding paraphenylenediamin, increasing the temperature of the mass and maintaining the increased temperature for a suitable period, and finally melting in sodium sulfid and drying.

In testimony whereof I have signed this specification in the presence of two subscribing witnesses.

ALCIDE FRANCOIS POIRRIER.

Witnesses:
JULES ARMENGAUD, Jeune,
EDWARD P. MACLEAN.